United States Patent [19]

Peroutka et al.

[11] 4,420,117
[45] Dec. 13, 1983

[54] WASTE PAPER DISINTEGRATING, SORTING AND FIBER RECOVERY APPARATUS

[75] Inventors: Fritz Peroutka; Helmut Thumm; Theodor Bähr, all of Heidenheim; Walter Stricker, Aalen, all of Fed. Rep. of Germany

[73] Assignee: J. M. Voith GmbH, Fed. Rep. of Germany

[21] Appl. No.: 281,075

[22] Filed: Jul. 7, 1981

[30] Foreign Application Priority Data

Jul. 10, 1980 [DE] Fed. Rep. of Germany ....... 3026136

[51] Int. Cl.³ .............................. B02C 19/00
[52] U.S. Cl. .................... 241/46.17; 241/60; 241/69; 241/79.1
[58] Field of Search ............... 241/28, 46.08, 46.11, 241/46.17, 46.04, 69, 75, 79.1, 60, 79.2, 79.3

[56] References Cited

U.S. PATENT DOCUMENTS

| | | | |
|---|---|---|---|
| 3,752,410 | 8/1973 | Dienst et al. | 241/69 |
| 3,788,568 | 1/1974 | Marsh | 241/69 |
| 4,272,315 | 6/1981 | Espenmiller | 241/69 X |
| 4,283,275 | 8/1981 | Heinbockel et al. | 241/28 X |

*Primary Examiner*—Mark Rosenbaum

*Attorney, Agent, or Firm*—Ostrolenk, Faber, Gerb & Soffen

[57] ABSTRACT

The disclosure concerns apparatus for disintegrating waste paper and for sorting out fibers to be recovered from the suspension. There is a disintegrating chamber connected by a gravity feed discharge line to a drum type or vibration sorting device. A circulating member disposed in the disintegrating chamber rotates about an axis that is tilted at a small acute angle from the vertical. A screen located beneath the circulating member separates the disintegrating chamber from a discharge chamber beneath the screen. The screen sorts out coarser particles letting only finer suspension paticles pass into the discharge chamber. A first suspension discharge line communicates with the discharge chamber while a second suspension discharge line communicates with the disintegrating chamber immediately above the screen. Both discharge lines empty into each other and lead to the sorting device. Appropriate slides control flow through the two discharge lines. The preferred sorting device is a horizontally oriented, rotatable, perforated drum and the suspension delivered into the drum is screened, with the good suspension being collected and the coarse material being trapped inside the drum to exit from an end.

19 Claims, 1 Drawing Figure

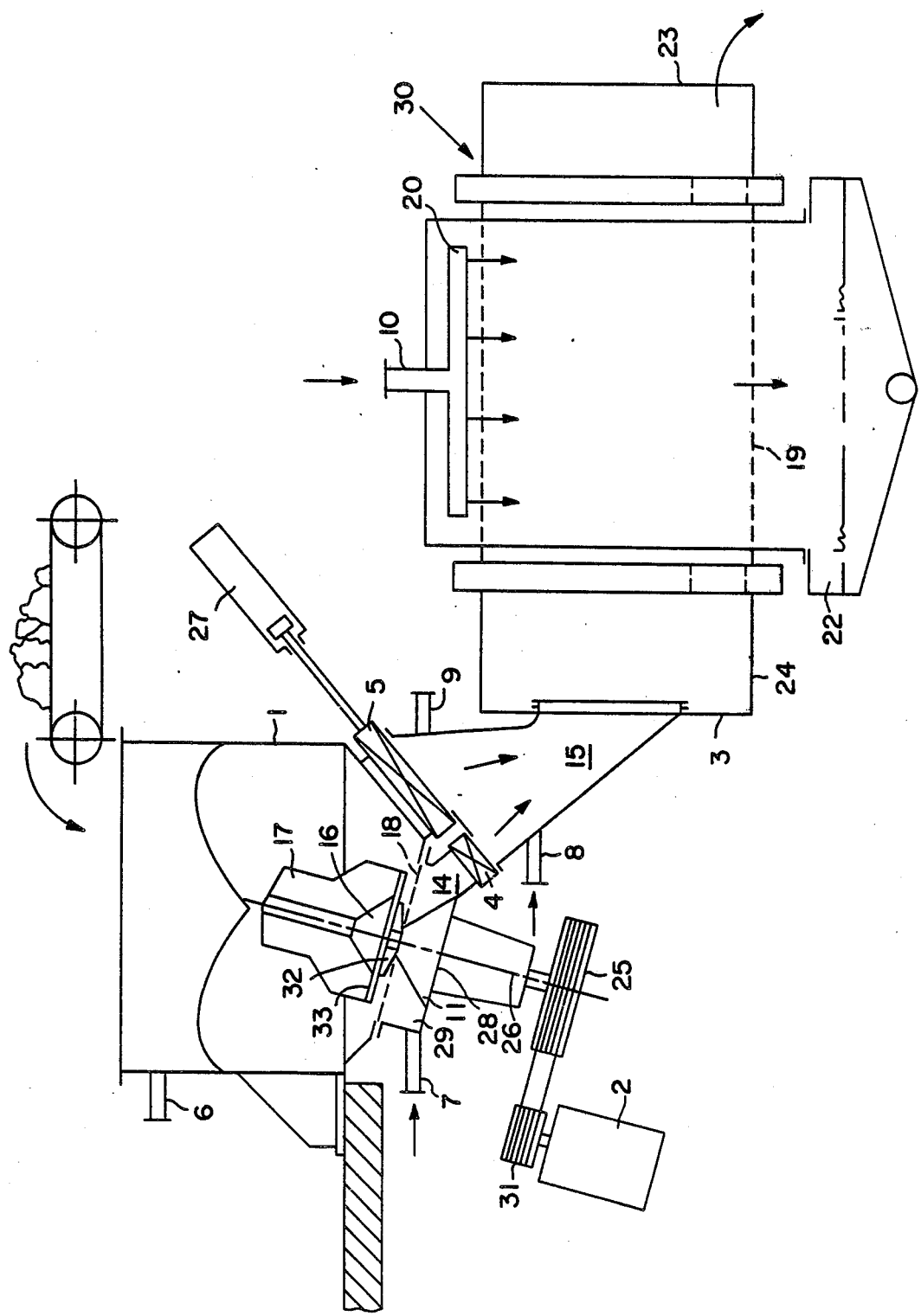

WASTE PAPER DISINTEGRATING, SORTING AND FIBER RECOVERY APPARATUS

BACKGROUND OF THE INVENTION

The invention relates to apparatus which disintegrates waste paper, sorts it as to fiber size and length and recovers reusable pulp fibers. The invention is particularly useful in the manufacture of paper and cardboard.

It was previously customary to disintegrate waste paper by spinning it in a container, wherein the spinning impurities in particular were first removed. More recently, a screen has also been provided in the pulp disintegrating container. This cooperates with a pulp circulating member to first comminute the pieces of waste paper, and to remove the other coarse impurities, since substantially only fiber portions which were of some recovery value because of their size were passed through the screen. Further sorting and disintegration following the pulp disintegrator was provided by another pulp disintegrator, which was also equipped with a rotating disintegrating and circulating member. This performed another fine subdivision of the suspension into different streams of pulp, in accordance with different values of weight, area or volume.

The foregoing apparatus is relatively expensive, considering that further sorting devices are indispensable in the further course of the process.

SUMMARY OF THE INVENTION

The object of the invention is to simplify the first disintegration and sorting stages, in particular, and if possible to also make continuous operation possible, which could also lead to a saving of intermediate vats.

This object is achieved with a device of the aforementioned type wherein paper is first disintegrated by mechanical action through a circulating member and in the presence of appropriate known pulping chemicals. The disintegrator includes a disintegrating chamber having a container therein for receiving the waste paper and for having the waste paper disintegrated therein. There is a suspension discharge chamber disposed beneath the bottom of the disintegrating chamber. The disintegrating chamber and suspension discharge chamber together comprise a unitary chamber with a screen separating them. There is a circulating member located near the bottom of the disintegrating chamber which is rotatable therein. There is a screen located between the circulating member and the discharge chamber beneath it and the screen screens out larger sized particles from the pulp suspension permitting the smaller sized, recoverable particles to pass into the discharge chamber.

As a preferred feature of the invention, the circulating member in the disintegrating chamber is not precisely vertical but is instead inclined at an acute angle to the vertical. The screen is also tilted from the horizontal by approximately the same angle, whereby the circulating member axis and the screen are perpendicular. The circulating member has a bottom side which is generally parallel to the screen.

There is a sorting device that is connected to both the disintegration chamber and the suspension discharge chamber by respective discharge lines. For convenience, the two discharge lines empty into each other.

Means, and particularly slides, are provided for selectively opening and closing the respective discharge lines to the disintegrating and the discharge chambers. The discharge line from the discharge chamber is a gravity feed line which leads to the sorting device.

The sorting device may be any well known sorting device, such as a vibration sorter. One preferred sorting device comprises a screen basket in the form of a perforated drum which is oriented with its axis horizontal. The discharge lines from the disintegrating and discharge chambers communicate into the interior of the screen basket. A collecting chamber outside the circumference of the screen basket collects the recoverable particles. The coarser particles screened out in the screen basket move through the drum and exit at the opposite end from the entrance to the drum.

Appropriate dilution water lines communicate into the discharge chamber for diluting the recoverable suspension before it passes into the discharge lines and communicate into the discharge lines leading to the sorting device.

With the device of the invention it is possible, with a suitably adjusted material feed, to assure continuous operation of at least the sorting drum, without an intermediate vat having to be placed between the disintegrator and the sorting drum. The present invention also avoids the difficulties from the formation and removal of strands experienced with known disintegrators.

DESCRIPTION OF A PREFERRED EMBODIMENT

Other objects and features of the invention will be evident from the following description of an illustrative embodiment shown in the drawing, which is a schematic depiction of an apparatus of the invention.

The apparatus comprises the disintegrator container 1 which has a chamber in which pulp suspension is produced to be delivered to the sorting device 30. The sorting device 30 is connected to the disintegrator 1 by a short discharge conduit 15 of large cross-section. This discharge conduit 15 discharges directly into the feed region 24 of the drum 3 of the sorting device 30.

The sorting device 30 includes a sorting drum 3 which rotates around a horizontal axis. The axially central portion of the drum 3 serves as a screen basket 19.

The disintegrator container 1 has a circulating member 16 supported in the bottom wall 28 of the container. The member 16 is provided with tall, radially projecting agitator blades 17. The waste paper and known pulping agents, and water are mixed in the container chamber and the agitator blades break up the paper and mix up the pulp suspension. The circulating member 16 rotates around an axis 26 which is inclined slightly from the vertical, i.e. at a small acute angle.

The circulating member 16 of the disintegrator 1 is driven from a motor 2 via drive pulleys 31 and 25 and drive belts. The circulating member 16 preferably includes agitator blades 17 shaped in the form of a multithread feed screw. Furthermore, it is most suitable for there to be ribs 32 provided on the bottom of a base plate 33 of the circulating member 16 which bears the agitator blades 17, in order to mix the suspension in the lowermost region of the container 1, particularly in the below described discharge chamber 29, with the water which is fed through a dilution-water line 7.

The lower part of the container 1 is tapered narrower in cross-section. The container 1 has a discharge chamber 29 at its bottom, which is separated by a pulp screen 18 from the rest of the container. A good quality pulp discharge line 14 extends away from and below the discharge chamber 29. The dilution-water line 7 is connected to the chamber 29 away from the discharge line 14. The screen 18 is inclined to the horizontal substantially at the same acute angle as the circulating member 16 is inclined to the vertical with the result that they are perpendicular.

In order that no substantial dilution of the suspension will take place in the region of the disintegrator above the plate 33, the plate, for practical purposes, separates a dilution zone lying below it, which includes the discharge chamber 29, from the rest of the container 1, and the rotating action of the ribs 32 is limited to the first-mentioned upper regions, possible with the use of additional damming elements, such as weirs, which are arranged in the vicinity of the ribs 32, but are positioned radially outward from them.

The heavy materials, i.e. the impurities having the greater volume and density, are to be withdrawn particularly through the discharge conduit 15. This conduit is connected to the lower part of the lower region of the container 1 immediately above the screen 18.

With the arrangement described, a high pulp density, i.e. ratio of weight of fibers to total suspension weight, is preferably provided in the disintegrator container 1, e.g. a pulp density of a value of about 10 to 20% and particularly 16%. In this way, the volume of the container 1 may be kept relatively small. For better discharge of suspension, therefore, provision is made to add dilution water through the dilution-water line 7 into the discharge chamber 29 for thinning the consistency of the material there.

Both the good-pulp discharge line 14 and the other discharge conduit 15 are equipped with respective slides 4, 5 in order to selectively close them off. It is possible to remove the good material continuously and to periodically open the discharge conduit 15 for heavy materials. The drive of both of the slides 4 and 5 can be effected by respective hydraulic servomotors, such as 27 shown for the slide 5.

For the better removal of the material from the disintegrator 1, dilution-water lines 8 and 9 can furthermore be provided for the discharge lines 14 and 15, respectively of the disintegrator.

The sorting drum 3 sorts the material discharged from the disintegrator container 1. The screen basket 19 has relatively large size holes, so that only pulp material of some recovery value passes through the screen basket 19 into the collection space 22, while the unusable material is discharged at the discharge end 23, which is opposite the entrance end 24 in communication with the discharge lines 14 and 15. There is a spray-water line 10 having a spray head 20 with nozzles or openings that spray water onto the surface of the screen basket 19 to clean the perforations.

From the illustration it can be noted that the sorting device 30 is arranged sufficiently below the discharge chamber 29 of the disintegrator 1 that the removal of the material from the disintegrator can take place by gravity. This discharge is further facilitated by the larger cross-section of the discharge conduit 15.

Instead of the illustrated rotating drum sorting apparatus, a vibration sorter of known construction could also be used. Like the screen basket 19, the sorter should be provided with a relatively large mesh of 18 mm or larger.

The strings and wires that secure the unsorted waste paper which is introduced into the disintegrator 1 tend, alone or together with other impurities, to form lumps. These are, however, readily removed from the apparatus of the invention with the assistance of dilution water from the lines 8 and 9.

An advantageous apparatus for the disintegration and rough sorting of waste paper delivered in bales in obtained with the invention. It is merely necessary to first cut the strings or wires which hold the bales together and then load the waste paper into the disintegrator.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Apparatus for disintegrating waste paper and for sorting fibers from the fiber suspension for recovery, comprising:
    a paper disintegrator, comprising: a disintegrating chamber including a container for having waste paper disintegrated therein; the disintegrating chamber having a bottom;
    means for applying a suspension of waste paper having a pulp density of about 10–20% to said container;
    a circulating member located near the bottom of the disintegrating chamber and being rotatable in the chamber about a respective rotation axis of the circulating member; the circulating member axis being inclined at an acute angle to the vertical;
    a suspension discharge chamber disposed beneath the bottom of the disintegrating chamber; a first suspension discharge line extending from a lower region of the discharge chamber for discharge of suspension from said discharge chamber through the first suspension discharge line; a dilution water line being connected to the discharge chamber for diluting said suspension of waste paper located in said discharge chamber to a lower density than that in said disintegrating chamber;
    a screen located between the circulating member and the discharge chamber and also defining a screen barrier between the disintegrating chamber and the discharge chamber, the screen preventing particles above a first predetermined size from passing into the discharge chamber from the disintegrating chamber; the screen being inclined from the horizontal by approximately the same angle as the circulating member axis is inclined from the vertical;
    the circulating member having a lower side which is oriented generally parallel to the screen;
    a second suspension discharge line communicating from the region in the disintegrating chamber above the screen for discharge of suspension through the second suspension discharge line;
    a sorting device communicating with the first and second suspension discharge lines; the sorting device having a screen mesh therein for passing particles smaller than a second predetermined size therethrough; said sorting device including a discharge opening which permits that portion of the suspension applied to said sorting device which does not pass through said screen mesh to continually exit said sorting device.

2. The disintegrating apparatus of claim 1, wherein the second discharge line is selectively closable and openable.

3. The disintegrating apparatus of claim 2, wherein the second discharge line being openable and closable comprises a shut-off slide arranged in the second discharge line and slidable to selectively open and close the first discharge line.

4. The disintegrating apparatus of either of claims 1 or 2, wherein the first discharge line is selectively closable and openable.

5. The disintegrating apparatus of claim 4, wherein the first discharge line being openable and closable comprises a shut-off slide arranged in the first discharge line and being slidable to selectively open and close the first discharge line.

6. The disintegrating apparatus of claim 5, wherein the second discharge line being openable and closable comprises a second shut-off slide arranged in the second discharge line and slidable to selectively open and close the first discharge line.

7. The disintegrating apparatus of claim 1, wherein the sorting device comprises:
- a screen basket in the form of a perforated drum which is oriented with its axis horizontal and the drum being rotatable around the horizontal axis thereof; the first and second discharge lines both communicating into the interior of the screen basket;
- a collecting chamber located outside the screen basket for receiving suspension passing through the screen basket; and
- an exit, defining said discharge opening, for coarse materials which are not passed through the screen basket from inside the screen basket.

8. The disintegrating apparatus of claim 7, wherein the first and second discharge lines enter the screen basket at one end thereof while the exit from the screen basket is from the opposite end of the screen basket.

9. The disintegrating apparatus of either of claims 7 or 8, wherein the collecting chamber is arranged on the circumference of the screen basket and is radially outside of the screen basket.

10. The disintegrating apparatus of claim 1, wherein the first discharge line discharges into the second discharge line.

11. The disintegrating apparatus of either of claims 1 or 10, further comprising a second dilution water line having an outlet directed toward the sorting device.

12. The disintegrating apparatus of either of claims 1 or 10, further comprising a second dilution water line discharging into the first discharge line.

13. The disintegrating apparatus of claim 12, further comprising a fourth dilution water line for discharging into the second discharge line.

14. The disintegrating apparatus of either of claims 1 or 10, further comprising a second dilution water line for discharging into the second discharge line.

15. The disintegrating apparatus of either of claims 1 or 10, wherein the second suspension discharge line has a substantially larger cross-section than the first suspension discharge line; the section suspension discharge line being connected to the lower part of the disintegrating chamber directly above the screen; the second suspension discharge line being inclined to facilitate direct feeding by gravity of material discharged from the disintegrating chamber.

16. The disintegrating apparatus of claim 15, wherein the circulating member comprises a base plate having agitator blades supported thereon and the agitaor blades being located above the base plate; the circulating member also having radial ribs thereon which are located beneath the base plate and above the screen.

17. The disintegrating apparatus of claim 1, wherein the circulating member comprises a base plate having agitator blades supported thereon and the agitator blades being located above the base plate; the circulating member also having radial ribs thereon which are located beneath the base plate and above the screen.

18. The disintegrating apparatus of claim 17, wherein the base plate is oriented generally parallel to the screen.

19. The disintegrating apparatus of claim 1, wherein the sorting device comprises a vibration sorter.

* * * * *